United States Patent Office 3,540,875
Patented Nov. 17, 1970

3,540,875
METHOD FOR THE CONTROL OF
AQUATIC PLANT LIFE
Gideon Berger, Niles, Ill., assignor to Velsicol Chemical Corporation, Chicago, Ill., a corporation of Delaware
No Drawing. Filed Mar. 27, 1968, Ser. No. 716,288
Int. Cl. A01n 9/00
U.S. Cl. 71—66          7 Claims

ABSTRACT OF THE DISCLOSURE

A method for the control of aquatic life which comprises contacting said plant life with a toxic amount of a composition which comprises a compound of the formula

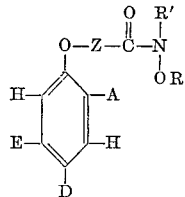

wherein A is selected from the group consisting of hydrogen, chlorine, unsubstituted lower alkyl and unsubstituted lower alkenyl; D is selected from the group consisting of hydrogen, halogen, unsubstituted lower alkyl and unsubstituted lower alkenyl; E is selected from the group consisting of hydrogen and chlorine; provided that a maximum of one of A and D is hydrogen, A is chlorine only when D is chlorine, and E is chlorine only when A and D are both chlorine; R' is selected from the group consisting of hydrogen and alkyl; R is alkyl; and Z is an unsubstituted alkylene group containing from one to four carbon atoms; and the alkali metal salts of said compounds wherein R' is hydrogen.

---

This invention relates to the control of aquatic pests and in particular relates to the control of undesirable aquatic plant life.

Aquatic plants cause a variety of problems in lakes, ponds, streams, irrigation systems, drainage canals, and in the cultivation of certain field crops. Thus in the recreational uses of water aquatic plants interfere with swimming and fishing, foul outboard motors and often impart undesirable flavors and odors to the water. In streams, irrigation systems and drainage canals aquatic plants interfere with the flow of water, effect increased evaporation and seepage, and cause clogging of structures; while in the cultivation of such field crops as rice, aquatic plants compete for soil nutrients and sunlight resulting in considerable reductions of yields. While many mechanical methods for the control of undesirable aquatic plant life have been proposed and used in the past, such as dredging, underwater mowing, hand cleaning and chaining, only partial success has been obtained. In recent years there has been an increased interest in the chemical control of aquatic plants and as a result a few chemical compounds which are effective in controlling some of the undesirable aquatic plants have been discovered.

It is surprising, however, in view of the vast number of herbicidally active compounds which are known, only a limited number of chemical compounds exhibiting activity towards aquatic plant life have been found. In a study by Frank et al. 1963 Weeds 11: 124-128, wherein ninety-one herbicides were tested for aquatic activity, it was found that little or no correlation between herbicidal activity toward terrestial vegetation and activity for the control of aquatic plant life exists.

In view of the aquatic weed problem and the limited development of chemical compounds which can be used to control such weeds it is readily apparent that additional compounds and compositions useful for this purpose are urgently required.

It has now been discovered that compounds of the formula

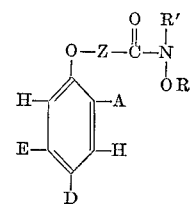

(I)

wherein A is selected from the group consisting of hydrogen, chlorine, unsubstituted lower alkyl and unsubstituted lower alkenyl; D is selected from the group consisting of hydrogen, halogen, unsubstituted lower alkyl and unsubstituted lower alkenyl; E is selected from the group consisting of hydrogen and chlorine; provided that a maximum of one of A and D is hydrogen, A is chlorine only when D is chlorine, and E is chlorine only when A and D are both chlorine; R' is alkyl; and Z is an unsubstituted alkylene group containing from one to four carbon atoms; and the alkali metal salts of said compounds where R' is hydrogen, possess unexpected activity for the control of aquatic plant life.

The active compounds of this invention can be prepared by the reaction of the appropriate acyl halides by the procedures detailed in the U.S. Pats. Nos. 3,027,407, 3,166,589, 3,166,591, 3,168,561 and 3,306,726.

Exemplary of these compounds are:

N-methoxy-2-methyl-4-chlorophenoxyacetamide
N-methoxy-N-methyl-2-methyl-4-chlorophenoxyacetamide
N-methoxy-2,4-dichlorophenoxyacetamide
N-methoxy-N-methyl-2,4-dichlorophenoxyacetamide
N-methoxy-2,4,-trichlorophenoxyacetamide
N-methoxy-N-methyl-2,4,5-trichlorophenoxyacetamide
N-methoxy-4-chlorophenoxyacetamide
N-methoxy-4-bromophenoxyacetamide
N-methoxy-N-methyl-4-chlorophenoxyacetamide
N-methoxy-N-methyl-α-(4-chlorophenoxy)-propionamide
N-ethoxy-2-methyl-4-chlorophenoxyacetamide
N-ethoxy-N-methyl-2-methyl-4-chlorophenoxyacetamide
N-ethoxy-2,4-dichlorophenoxyacetamide
N-ethoxy-N-methyl-2,4,5-trichlorophenoxyacetamide
N-ethoxy-N-methyl-4-chlorophenoxyacetamide
N-methoxy-2-methylphenoxyacetamide
N-methoxy-4-methylphenoxyacetamide
N-methoxy-2,4-dimethylphenoxyacetamide
N-methoxy-2-ethylphenoxyacetamide
N-methoxy-2-isopropylphenoxyacetamide
N-methoxy-2-allylphenoxyacetamide
N-methoxy-β-(2-methyl-4-chlorophenoxy)-propionamide
N-isopropoxy-2-methylphenoxyacetamide.

The alkali metal salts of the active compounds of this invention wherein R' is hydrogen are particularly useful for the purpose of this invention since they are relatively soluble in water. These alkali metal salts can be prepared from the corresponding N-monosubstituted amide by treating with an equimolar amount of alkali metal hydroxide. The reaction can be performed by heating, if required, in a solvent such as an alcohol or an alcohol-ketone mixture such as an ethanol-dioxane mixture.

The desired salt can be recovered from the reaction mixture by evaporating the solvent, by extraction and the like. Exemplary of the alkali metal salts are: the potassium salt of N-methoxy-2-methyl-4-chlorophenoxyacetamide, the sodium salt of N-methoxy-2-methoxy-4-chlorophenoxyacetamide, the potassium salt of N-methoxy-2,4-dichlorophenoxyacetamide, the sodium salt of N-methoxy-2,4-dichlorophenoxyacetamide, the sodium salt of N-ethoxy-4-chlorophenoxyacetamide, the potassium salt of N-methoxy-2,4-dichlorophenoxyacetamide and the like.

In a preferred embodiment of this invention the active compound is selected from the group consisting of compounds of Formula I wherein A is selected from the group consisting of chlorine and unsubstituted lower alkyl, D is chlorine, E is hydrogen and R', R and Z are as heretofore described, and the alkali metal salts of the said compounds wherein R' is hydrogen.

For practical use in controlling aquatic plant life, the active compounds of this invention can be used as such or can be formulated into compositions which comprise an inert carrier or a diluent and a toxic amount of such a compound. Such compositions, which can also be called formulations, often enable the active compound to be applied conveniently to the site of the aquatic weed infestation in any desired quantity. These compositions can be liquids such as solutions or emulsifiable concentrates, or solids such as granules, wettable powders or pellets.

Solutions of the active compounds of this invention can usually be prepared by dissolving the compound in a common organic solvent such as kerosene, xylene, acetone, methanol or the like. In many instances the compounds of this invention are soluble in water. Thus, for example, the alkali metal salts of the compounds of this invention wherein R' is hydrogen can be readily prepared as aqueous solutions.

Emulsifiable concentrates comprise an active compound according to this invention, a solvent and an emulsifier. The solvent employed in an emulsifiable concentrate is not critical providing it dissolves the active compound. In some instances, however, it can be advantageous to use a solvent which itself exhibits some activity for the control of aquatic weeds. Aromatic solvents derived from coal tar and petroleum are of this type. The emulsifiers most commonly used are nonionic or mixtures of nonionic with anionic surface active agents.

Solid formulations such as granules can be prepared by impregnating the active compound, usually dissolved in a suitable solvent, onto and into granulated carriers such as the attapulgites or the vermiculites usually of a particle size range of from about 3.0 to about 5 mm. For example, a typical granular formulation can be prepared by charging absorbent granules into a tumbler mixer and then applying a solution of the active compound in the form of a fine spray until the desired concentration of active ingredients is obtained.

Wettable powders consists of admixtures of finely divided powders of an inert carrier, such as talc, clay, silica, pyrophillite and the like and an active compound, to which wetting agents have been added. Such formulations are usually prepared by grinding and blending the ingredients until a free flowing dust of the desired particle size is obtained.

Pelletized formulations consists of active compound, a solid inert carrier and a binding agent. Suitable binding agents are hardenable materials, such as vinyl chloride-vinyl acetate copolymers, hydrocarbon resins, alkyd resins, drying oil, rosin esters, varnishes, phenolic resins, and any of the film forming polymeric materials commonly used in the paint industry. Pellets are usually prepared by mixing the active compound, the inert carrier and the binding agent which can be in a solution form, until a paste results. This paste is then extruded into pellets of any desired size or shape and is then hardened by evaporating the solvent, heat curing the polymeric material or other methods as required. Such pelletized formulations often have the advantage of releasing the active ingredients at a controlled rate resulting in better and longer lasting control of aquatic plants.

The concentration of the active compounds of this invention in the various formulations will vary greatly with the type of formulation and the purpose for which it is designed; but generally the formulations will contain from about 0.05 to about 95 percent by weight of the active compounds of this invention.

The compositions of this invention can be applied to the site of the aquatic weed infestation in a manner recognized by the art. One method for the control of aquatic weeds comprises contacting said weeds with a toxic amount of a compound of this invention or a composition which comprises a carrier and an active compound of this invention. Another method for the control of aquatic welds comprises contacting the water in which said weeds grow with a toxic amount of a compound or composition heretofore described. Yet another method comprises treating the soil in which aquatic weeds grow with a described composition.

Undesirable aquatic plant life usually consists of algae and aquatic weeds. Such plants have no economic value and interefere with the utilization of the waters in which they grow.

While there is a vast number of known algae, the more common ones can be classified into four major groups as blue-green algae which include such forms as Oscillatoria, Anacystis and Desmonema; the green algae such as Chlorella, Pediastrum and Spyrogyra; the diatoms such as Cyclotella and Navicula; and the pigmented flagellates such as Euglena and Synura.

Aquatic weeds are undesirable plants which normally start in water and grow at least part of their life cycle in water. These weeds can be classified into submerged weeds, emergent weeds, marginal weeds and floating weeds. Among the submerged weeds, or those which primarily spend their life cycle below the surface of water, are fanwort, water-starworts, coontail, needlerush, spikerush, elodea, dense waterweed, Western waterweed, water stargrass, St. Johnsworts, waterprimrose, watermilfoil, parrots feather, naiads, pondweed, wrinkled-leaf pondweed, fine-leafed pondweed, leafy pondweed, American pondweed, sago pondweed, Richardson's pondweed, bladderworts, eelgrass, horned pondweed, whitestem pondweed, giant pondweed, waterbuttercup, ducksalad and waterplantain. Among the emergent weeds, or those aquatic weeds which send stems and leaves above the water surface, are watershield, watercress, spatterdock, waterlilies, waterparsley, arrowarum, waterlettuce, white water crowfoot and water chestnut. Marginal weeds are those aquatic plants which grow at the edge of lakes, ponds, streams and canals or in relatively shallow waters. Among this type are cattails, sweetflag, alders. Mexican-weed, Oregon sugargrass, sedge, waterwillow, saltgrass, spikerush, horsetail, rosemallow, pennywort, rushes, cutgrass, lotus, goldenclub maidencane, paragrass, knotgrass, reedgrass, waterpepper, pickerelweed, marshmarigold, arrowhead, bulrushes, saltgrass, woolgrass, burreed, cardgrass, gooseweed, saltcedar and giant cutgrass. Examples of floating weeds are waterhyacinth, duckweed, waterfern, alligatorweed, big duckweed, and watermeals.

The quantity of active compound required to control aquatic weeds is dependent on a variety of factors such as the hardiness of the particular weed species, method of application, weather, depth and flow of water, density of phytoplankton, temperature, water hardness, pH and the like. Generally, a rate of from about 0.05 to about 50 lb. of active compound per acre or, a concentration of about 0.1 to about 100 p.p.m. in the water in which the weeds are growing can be required for good control of aquatic weeds. For example, to control submerged plants in static water a concentration of only about 5 p.p.m. or less can be sufficient, however, to control the same plants in rapidly moving water a concentration of up to 100 p.p.m. may be required.

The active compounds of the present invention are also useful when combined with other aquatic herbicides in the compositions heretofore described. These other materials can comprise from about 5 to about 95 percent of the active ingredients in the compositions. Use of combinations of these other aquatic herbicides with the compounds of this invention often provide compositions which are more effective than separate compositions of the individual compounds. The other aquatic herbicides with which the compounds of this invention can be combined include such compounds as copper sulfate, sodium arsenite, acriflavin, acrolein, alum, amitrol, ammonium sulfamate, sodium chlorate, atrazine, benzenehexachloride, CDEA, chlorinated benzene, 2,4-D, dalapon, dichlone, diquat, diuron, DNBP, DNC, DNCHP, 2,3-DNQ, dichloropropionic acid, erbon, fenac, fenuron, ferbam, hexachloroacetone, IPC, potassium, permanganate, MCPA, maleic hydrazide, monuron, colloidal silver, polychlorobenzoic acid, neburon, trichloroacetic acid, pentachlorophenol, pyridylmercuric acetate, 2,3-dichloronaphthaquinone, silvex, simazine, 2,4,5-T, TBA, trichloroacetic acid, trichlorobenzene, trichloroethylene potassium azide and ziram.

Such compounds can also be used in the form of their salts, esters, amides, and other derivatives whenever applicable to the particular parent compound.

The effectiveness of the compounds of this invention for the control of aquatic plant life was demonstrated in an experiment for the control of sago pondweed (*Potamogeton pectinatus*), American pondweed (*Potamogeton nodosus*) and waterweed (*Elodea canadensis*). In this experiment potted test plants were fully submerged by being placed into glass vessels containing 20 liters of water and the sodium salt of N-methoxy-2-methyl-4-chlorophenoxyacetamide at the indicated concentrations. The severity of the injury was determined at weekly intervals for four weeks and was rated on a scale from 0 to 10 as follows: 0 = no injury, 1,2,3, = slight injury but plants continue to grow; 4,5,6, = moderate injury, plants cease growth; 7,8,9 = severe injury, growth completely inhibited, varying degrees of necrosis of plant organs; 10 = complete kill of plants above soil line. The results are shown in the following table:

| Weed species | Concentration of test compound, p.p.m. | Weed injury, weeks after treatment | | | |
|---|---|---|---|---|---|
| | | 1 | 2 | 3 | 4 |
| *Elodea canadensis* | 5 | 0 | 8 | 8.5 | 10 |
| *Elodea canadensis* | 50 | 7 | 8 | 9 | 10 |
| *Potamogeton nodosus* | 5 | 0 | 10 | 10 | 10 |
| *Potamogeton nodosus* | 50 | 1 | 10 | 10 | 10 |
| *Potamogeton pectinatus* | 5 | 0 | 10 | 10 | 10 |
| *Potamogeton pectinatus* | 50 | 1 | 10 | 10 | 10 |

I claim:
1. A method of controlling the growth of aquatic plant life which comprises applying to the aquatic plant life, or its locus, a composition comprising a toxic quantity of N-methoxy-2-methyl-4-chlorophenoxyacetamide, its sodium salt and its potassium salt.

2. The method of claim 1 wherein the composition is incorporated into the water containing the aquatic plant life.

3. The method of claim 1 wherein the composition comprises an inert carrier and an active compound.

4. The method of claim 2 wherein the composition incorporates into the water from about 0.1 part of about 100 parts by weight of active compound per million parts of water.

5. The method of claim 1 wherein the active compound is N-methoxy-2-methyl-4-chlorophenoxyacetamide.

6. The method of claim 1 wherein the active compound is the sodium salt of N-methoxy-2-methyl-4-chlorophenoxyacetamide.

7. The method of claim 1 wherein the active compound is the potassium salt of N-methoxy-2-methyl-4-chlorophenoxyacetamide.

References Cited
UNITED STATES PATENTS 3,166,591 1/1965 Richter _____ 260—559
3,168,561 2/1965 Richter _____ 260—559

LEWIS GOTTS, Primary Examiner

C. L. MILLS, Assistant Examiner

71—67; 260—453

PO-1050
(5/69)

UNITED STATES PATENT OFFICE
CERTIFICATE OF CORRECTION

Patent No. 3,540,875      Dated November 17, 1970

Inventor(s) Gideon Berger

It is certified that error appears in the above-identified patent and that said Letters Patent are hereby corrected as shown below:

In column 2, line 43 for "2,4-trichlorophenoxyacetamide" read --2,4,5-trichlorophenoxyacetamide--.

Column 3, line 56 for "3,0" read --0.3--.

Column 6, line 25 for "of about" read --to about--.

Signed and sealed this 11th day of April 1972.

(SEAL)
Attest:

EDWARD M. FLETCHER, JR.
Attesting Officer

ROBERT GOTTSCHALK
Commissioner of Patents